United States Patent
Ghemawat

(10) Patent No.: US 9,002,860 B1
(45) Date of Patent: Apr. 7, 2015

(54) ASSOCIATING SUMMARIES WITH POINTERS IN PERSISTENT DATA STRUCTURES

(75) Inventor: Sanjay Ghemawat, Mountain View, CA (US)

(73) Assignee: Google Inc., Mountain View, CA (US)

( * ) Notice: Subject to any disclaimer, the term of this patent is extended or adjusted under 35 U.S.C. 154(b) by 38 days.

(21) Appl. No.: 13/366,934

(22) Filed: Feb. 6, 2012

(51) Int. Cl.
*G06F 17/30* (2006.01)
*G06F 12/02* (2006.01)

(52) U.S. Cl.
CPC .................................. *G06F 12/0284* (2013.01)

(58) Field of Classification Search
USPC ......................................................... 707/755
See application file for complete search history.

(56) References Cited

U.S. PATENT DOCUMENTS

| | | | | | |
|---|---|---|---|---|---|
| 5,519,855 | A | * | 5/1996 | Neeman et al. | 1/1 |
| 5,737,603 | A | * | 4/1998 | Fujiki | 1/1 |
| 5,848,405 | A | * | 12/1998 | Norcott | 1/1 |
| 5,907,841 | A | * | 5/1999 | Sumita et al. | 1/1 |
| 2002/0103811 | A1 | * | 8/2002 | Fankhauser et al. | 707/104.1 |
| 2004/0181588 | A1 | * | 9/2004 | Wang et al. | 709/207 |
| 2009/0019345 | A1 | * | 1/2009 | Kaufman et al. | 714/807 |
| 2010/0318538 | A1 | * | 12/2010 | Wyman et al. | 707/759 |
| 2012/0072656 | A1 | * | 3/2012 | Archak et al. | 711/104 |

* cited by examiner

*Primary Examiner* — Apu Mofiz
*Assistant Examiner* — Jared Bibbee
(74) *Attorney, Agent, or Firm* — Birch, Stewart, Kolasch & Birch, LLP

(57) ABSTRACT

Methods for organizing and retrieving data values in a persistent data structure are provided. Data values are grouped into data blocks and pointers are obtained for each data block. In addition, one or more summaries, related to a properties of the data block, are created and associated with the data block's pointer. The summaries allow for a more efficient retrieval of data values from the data structure by preventing unnecessary retrieval calls to persistent storage when the summaries do not match query criteria.

19 Claims, 8 Drawing Sheets

ASSOCIATING SUMMARIES WITH POINTERS IN PERSISTENT DATA STRUCTURES

BACKGROUND

Software developers use various persistent data structures or database implementations to store and organize data. Within these databases, individual data values are often grouped into data blocks, which are used as units of transfer to and from persistent storage such as disk, flash, or network storage. Each data block has a data type called a pointer associated with it that contains the data block's memory address. Specific data values can be obtained from the database by: (1) dereferencing pointers to find referenced data blocks, (2) retrieving the data blocks from persistent storage, and (3) parsing the data blocks to find the data values.

FIG. 1 illustrates a conventional database structure as discussed above. Individual data values (109) in the database are often grouped into data blocks (111) containing key→value pairs. As shown in FIG. 1, the data blocks can include key→value pairs where the keys are people's names and the values are the people's dates of birth. Each data block has a pointer (101a, 101b) associated with it that contains the data block's memory address for retrieving the data block. A conventional data retrieval would include: (1) dereferencing the pointer; (2) loading the associated data block into memory; and (3) parsing the loaded data block to find the desired key→value pair(s).

For example, a conventional search to find "all the people born in 1966" in the database structure of FIG. 1 requires that each pointer (101a, 101b) to a data block (111a, 111b) in the database be dereferenced to find each pointer's data block. Each data block (111a, 111b) is then retrieved from persistent storage and parsed to find the key→value pairs having "1966" as the birth year of their date of birth value. This process continues until all of the data blocks are retrieved and parsed. In FIG. 1, the first data block (111a) contains key→value pairs with birth years of 1954, 1964, 1977, 1978, and 1985. However, the conventional retrieval process requires the retrieving and parsing this data block even though the birth year "1966" will not be in the data block. Accessing persistent storage is time-consuming and expensive for computer applications.

SUMMARY

This specification describes technologies relating to data storage, data querying, data retrieval, and database management in general, and specifically to computer-implemented methods for managing a database that reduce the number of times data blocks must be retrieved from persistent storage such as disk, flash, or network storage when a search is performed for specific data values in a database.

In general, one aspect of the subject matter described in this specification can be embodied in a computer-implemented method for managing a database comprising: receiving a data set to be stored in a database; organizing and storing the data set into data blocks; obtaining a pointer to each data block; for at least one data block, obtaining a summary of a property of the data values stored in the data block; associating the obtained summary with the data block's pointer; and storing the data block's summary with the data block's pointer. Another aspect of the subject matter described in this specification can be embodied in a computer-implemented method for managing a database comprising: receiving a data structure query; loading a data block pointer and an associated summary into memory; comparing a criteria of the received query to information from the loaded summary responsive to a match between the query criteria and information from the summary, dereferencing the data block pointer to find the referenced data block, retrieving the referenced data block from persistent storage, and parsing the retrieved data block to obtain values that are responsive to the query criteria before returning the query results; and responsive to no match between the query criteria and the information from the summary, skipping the data block pointer traversal, the retrieval of the referenced data block from persistent storage, and the parsing of the retrieved data block; and returning the query results.

These and other embodiments can optionally include one or more of the following features: the summary can be a Bloom Filter or a bit-vector; the summary can store range information; and the data structure can be a B-tree or an sstable.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

DETAILED DESCRIPTION

Figure 1:
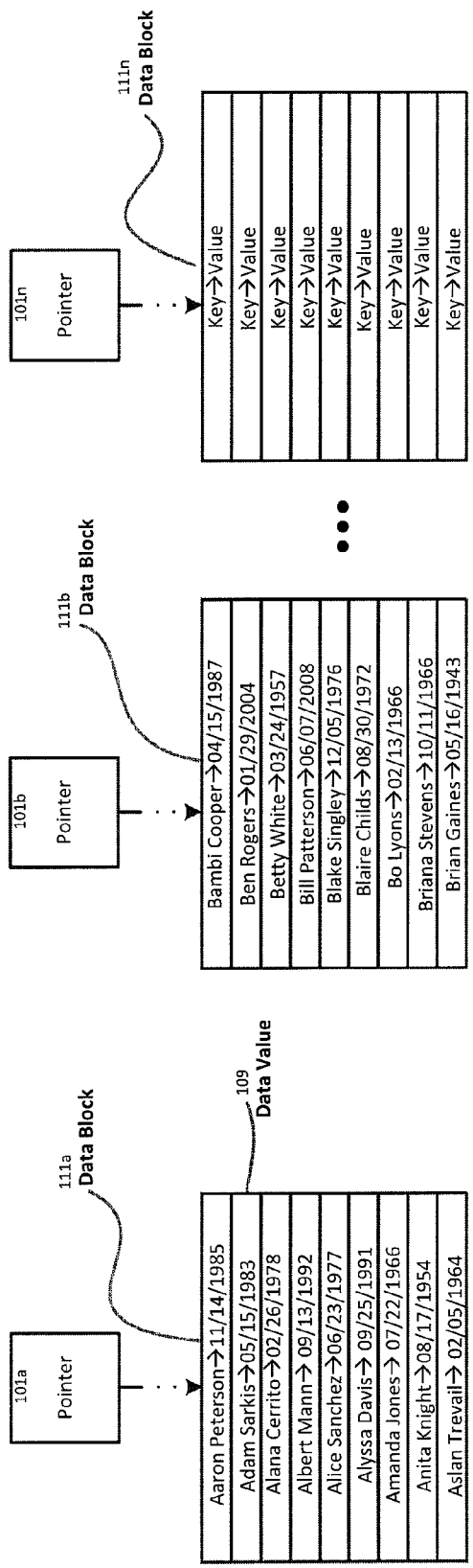
FIG. 1 is a block diagram illustrating an example of conventional database storage and organization.
Figure 2:
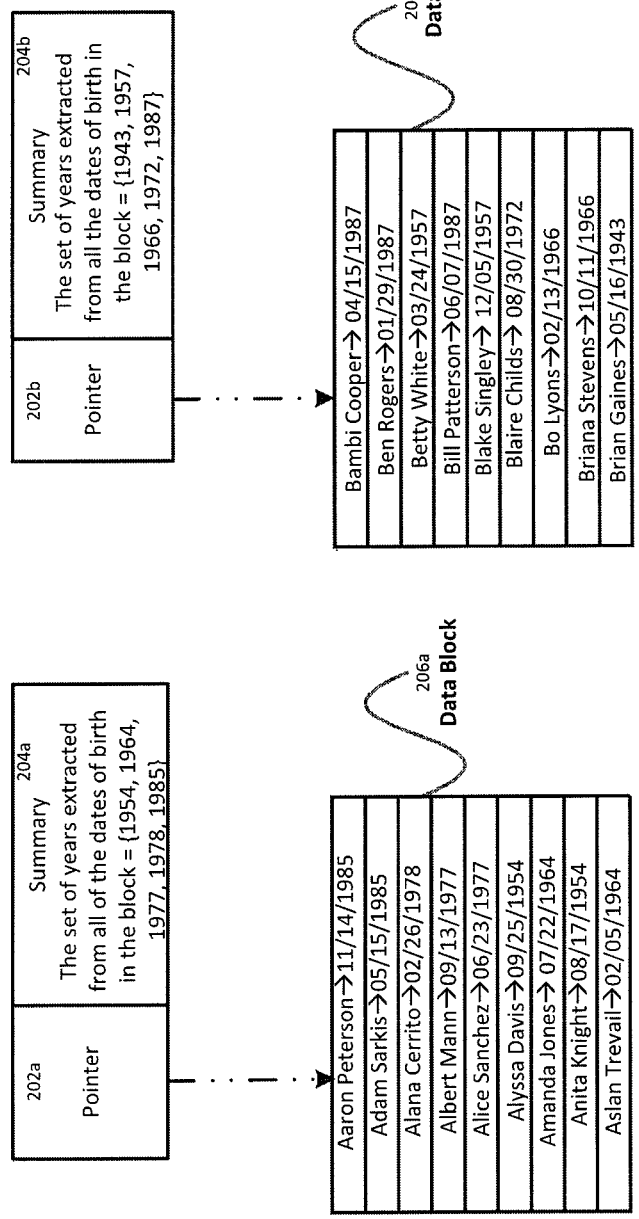
FIG. 2 is a block diagram illustrating the association of a pointer and a summary with a data block according to aspects of the invention.

According to an exemplary embodiment as illustrated in FIG. 2, each data block (206a, 206b) also has at least one summary (204a, 204b) associated with it, which is stored adjacent to the pointer (202a, 202b).

This summary (204a, 204b) is a concise representation or approximation of a property of the data values stored in the data block. As an example, represented by FIG. 2, each data block (206a, 206b) in the database can contain key→value pairs where the keys are people's names and the values are people's dates of birth. Each data block summary (204a, 204b) can contain, for example, a set of years that represents the dates of birth in the values of the key→value pairs in the associated data block. As illustrated in FIG. 2, one data block (206a) can contain nine key→value pairs with the following respective birthdate years: 1985, 1985, 1978, 1977, 1977, 1954, 1964, 1954, and 1964. An exemplary summary for this data block could be "the set of years extracted from all the dates of birth in the block: {1954, 1964, 1977, 1978, 1985}."

Likewise, another data block (206b) can contain nine key→value pairs with the following respective birthdate years: 1987, 1987, 1957, 1987, 1957, 1972, 1966, 1966, and 1943. A summary (204b) for this data block (206b) could be "the set of years extracted from all the dates of birth in the block: {1943, 1957, 1966, 1972, 1987}."

Although the summaries illustrated in FIG. 2 are sets, a summary can be any data type that can be used to test whether a block could contain a data value that satisfies a particular query. Some examples are: a bit-vector, a data range, and a Bloom Filter. Furthermore, although only two data blocks are shown in FIG. 2, the database could include hundreds, thousands, or many more such data blocks.

The data value property summarized in the summary can be selected based on various criteria. For example, historical query data can be used to determine a commonly-queried property and a summary can represent or approximate the data values for the commonly-queried property. In other instances, summaries can be determined by a database administrator who specifies the properties that should be summarized when setting up the database based on knowledge of how the database will be used, such as which applications will be accessing or querying the database. In still other instances, the database system itself can determine summaries by keeping a log of the recent queries and using periodic analysis to find the most common types of queries. The system can then use the properties examined in those queries to determine which properties should be stored in the summary.

Although a summary can produce false positive results, it should not produce false negative results. If the summary asserts that data values in a given block are not a match for the search criteria, this assertion must be true. However, if the summary asserts that the data values in the given block are a match for the search criteria, this assertion may or may not be true.

Figure 3:
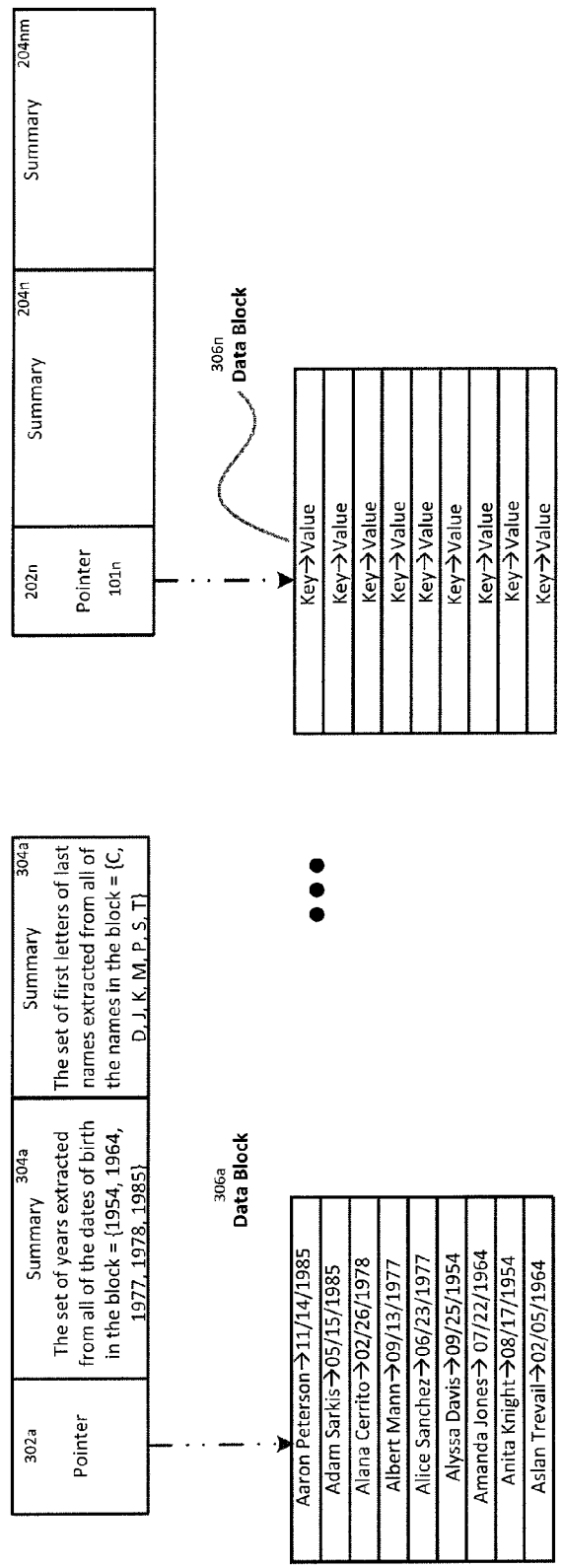
FIG. 3 is a block diagram illustrating the association of a pointer and multiple summaries with a data block according to aspects of the invention.

There can also be multiple summaries per data block if the database system needs to support multiple types of queries as depicted in FIG. 3. For example, if the database depicted in FIG. 3 needed to be searchable by both birth year and first name, each data block could have one summary that is a Bloom Filter of birth years and another summary that is a Bloom Filter of first names. All summaries will be loaded into memory when the pointer associated with them is loaded into memory.

Summaries can be automatically generated and managed by the database. Summaries can be added to immutable and mutable databases. For immutable data structures, the summary is computed per-block when the data set is being partitioned into data blocks and the blocks are being saved to persistent storage. For mutable data structures, the summary is computed the same way as for immutable data structures. However, the summaries stored with the pointers need to be updated when corresponding data block is updated or a copy-on-write implementation should be used.

Although FIG. 2 and FIG. 3 depict the summaries stored right next to pointers, this configuration is not the only way summaries and pointers can be stored. (See FIG. 5a, 5b, and description below)

Figure 4:
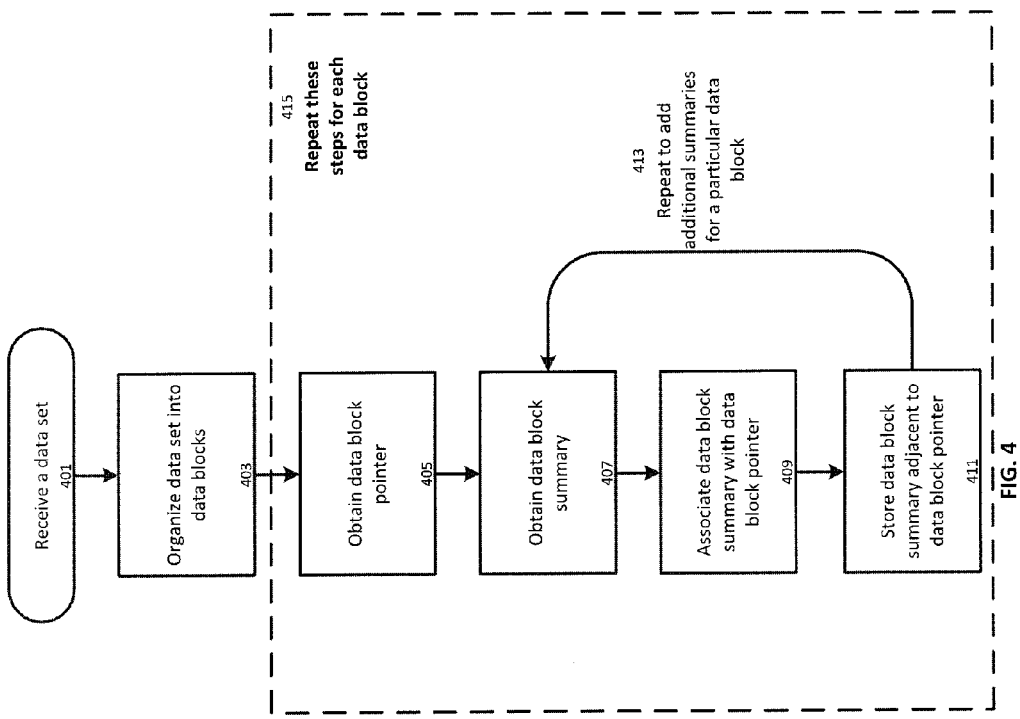
FIG. 4 is a flow diagram illustrating a method for organizing and storing data values in a persistent database according to aspects of the invention.

FIG. 4 illustrates an exemplary method for managing a database according to aspects of the inventive concepts. The method begins with receipt of a data set to be stored in the database (401). The dataset is organized into data blocks (403). A pointer and a summary are generated for each block (405, 407). The pointer and the summary are then associated with one another and stored in close proximity to each other in both persistent storage and in memory (411). Although the exemplary databases shown in FIGS. 3 and 4 illustrate summaries associated with each data blocks, there can be instances where some data blocks have associated summaries and others do not.

Figure 5A:
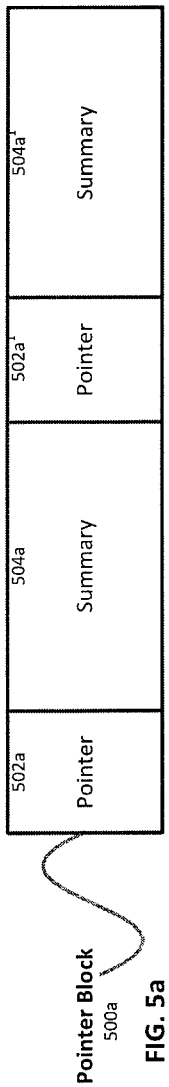
FIG. 5a is a block diagram illustrating an example of storing pointers and summaries in a pointer block according to aspects of the invention.
Figure 5B:
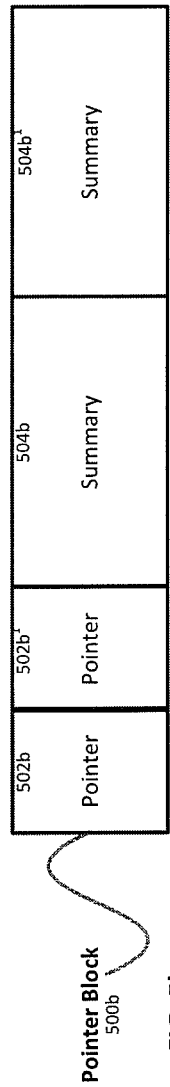
FIG. 5b is a block diagram illustrating an example of storing pointers and summaries in a pointer block according to aspects of the invention.

It is advantageous when a summary is less time-consuming to access than the data block associated with the summary. A typical way to implement the summary so that it is less time-consuming to access is to place both the pointer (502a) and the summary (504a) adjacent to each other in persistent storage and also adjacent to each other when stored in memory as depicted by FIG. 5a. However, another implementation with the same advantage is to separate the pointers and their associated summaries into two distinct regions of the same pointer block (500b), depicted by FIG. 5b. Since reads from persistent storage will retrieve an entire pointer block at one time, both the pointer and its associated summary will be available in memory at the same time.

Figure 6:
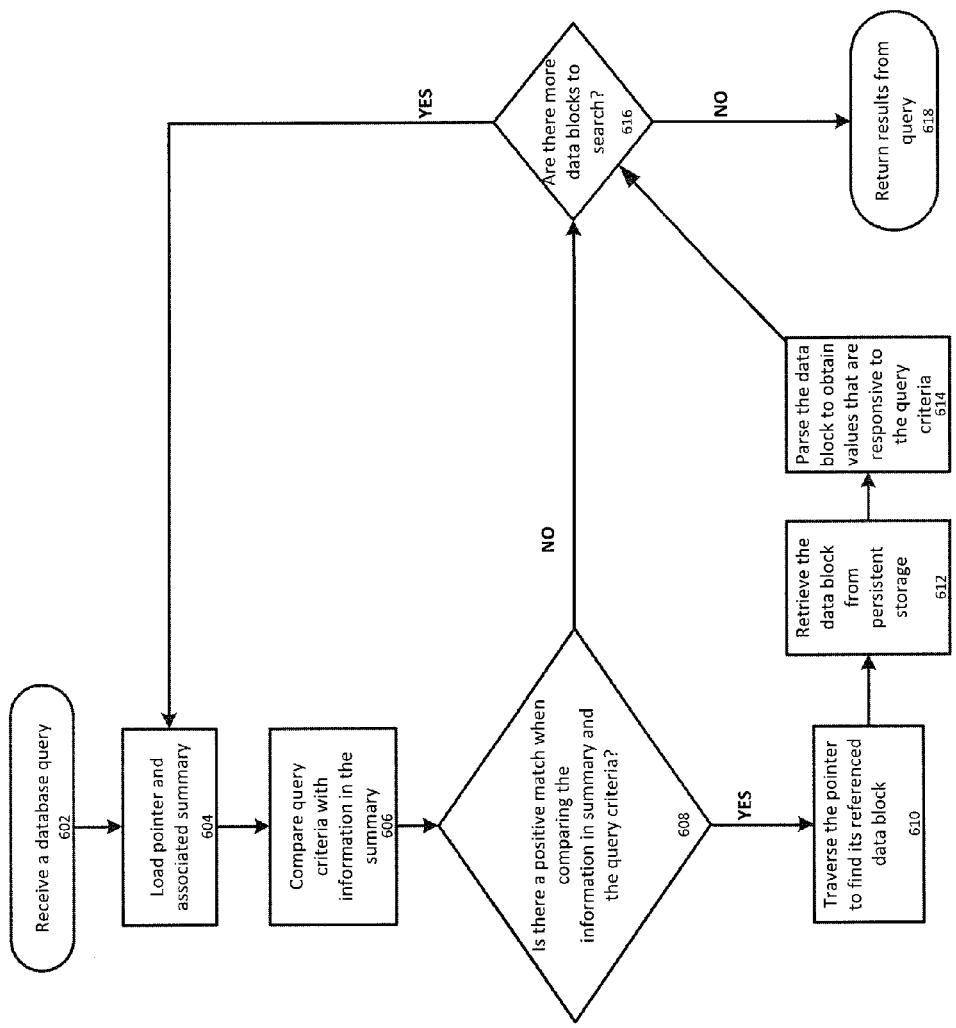
FIG. 6 is a flow diagram illustrating a method for querying and retrieving data values in a persistent database according to aspects of the invention.

According to another embodiment, the summaries can be used to more efficiently respond to a query. As shown in FIG. 6, the process begins when a database query is received. (602) A pointer and its associated summary are loaded into memory. (604) This load retrieves an entire pointer block which includes multiple pointers and summaries. The query's criteria are compared with information in the loaded summary. (606) If there is a positive match when comparing the information in the summary and the query criteria, data values matching the query criteria are obtained by: (1) dereferencing the pointer to find its referenced data block (608), (2) retrieving the data block from persistent storage (610), and (3) parsing the data block to find the matching data values (612). If there is not a positive match, the pointer is not dereferenced and the data block is not retrieved from persistent storage. (608) When querying for specific data values in a database, expensive and time-consuming retrieval calls to persistent storage can be reduced by associating a data block with a summary that is stored adjacent to the data block's pointer and represents a property of the data values stored in the data block. This summary can be relatively quickly compared with query criteria. If there is no positive match between the query criteria and the summary, there is no need to retrieve the summary's associated data block from persistent storage.

For example, if the database depicted in FIG. 2 were queried to find all the people born in 1966, the query criteria, "year of birth=1966" would be compared with the summary of each data block (206a, 206b). As discussed above, in this example there is one data block (206a) that contains a summary with the value, "the set of years extracted from all the dates of birth in the block: {1954, 1964, 1977, 1978, 1985}" (204a). Another data block (206b) contains a summary with the value, "the set of years extracted from all the dates of birth in the block: {1943, 1957, 1966, 1972, 1987}." (204b) When the query criteria is compared to the first data block's summary (204a), there is no match because the query criteria, "year of birth=1966", has the year of birth as 1966 and is not in the set of years {1954, 1964, 1977, 1978, 1985} extracted from all the dates of birth in the block. By using the summary, the first data block (206a) can quickly be eliminated as a data block that can contain the data any user entry with a birth year of 1966 without retrieving the data block from persistent storage.

When the query criteria is compared to the other data block's (206b) summary, there is a match because the query criteria has "1966" as the year of birth which is in the set of years {1943, 1957, 1966, 1972, 1987} extracted from all the dates of birth in the block. Accordingly, the data block's pointer will be traversed to find the data block (206b). Then, the data block (206b) will be retrieved from persistent storage and parsed to find data values containing the birth year "1966."

Figure 7:
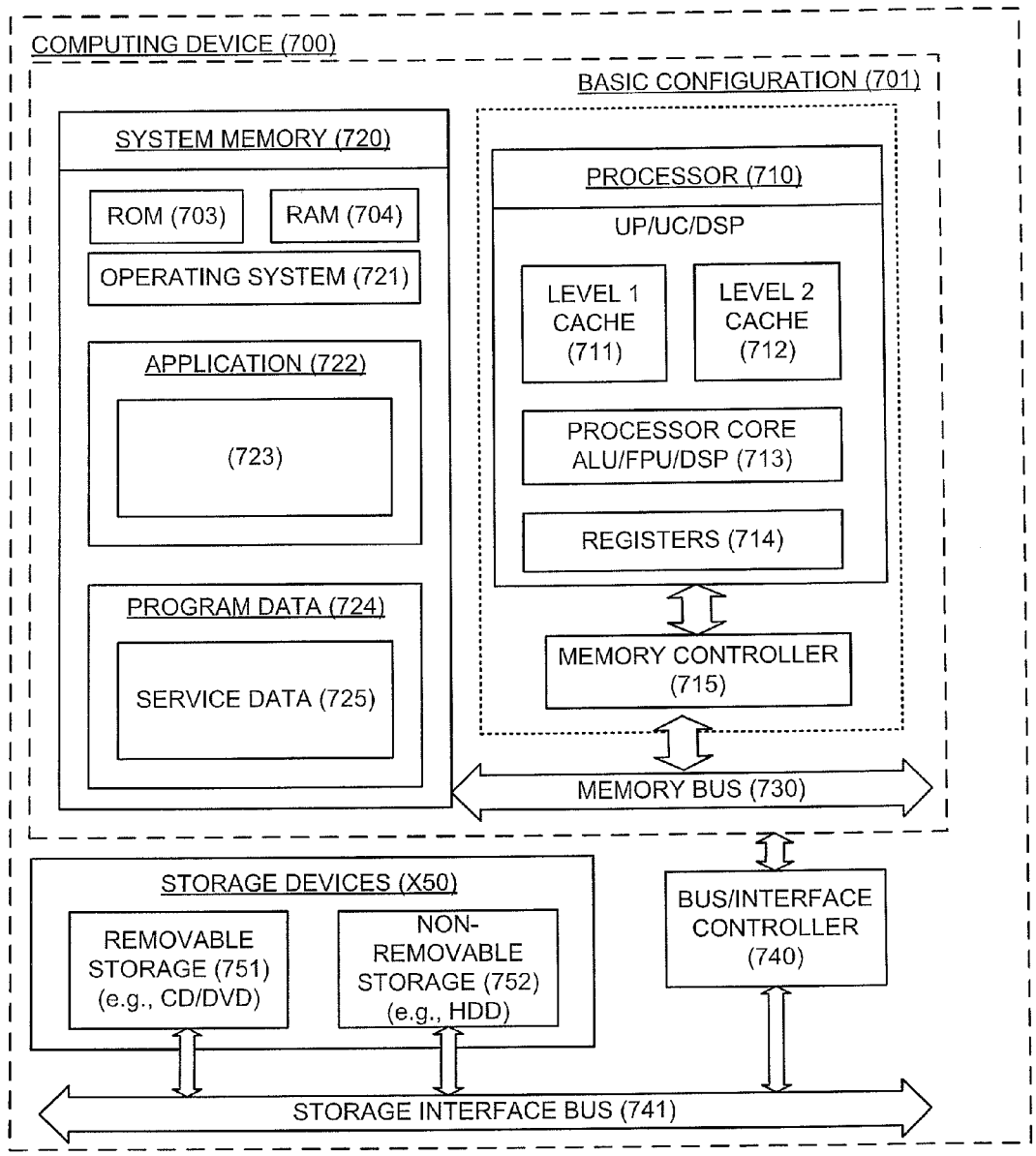
FIG. 7 is a block diagram illustrating an example computing device that may be used to implement various aspects of the invention.

FIG. 7 is a block diagram illustrating an example computing device (700) that is arranged for managing a database. In a very basic configuration (701), the computing device (700) typically includes one or more processors (710) and system memory (720). A memory bus (730) can be used for communicating between the processor (710) and the system memory (720).

Depending on the desired configuration, the processor (710) can be of any type including but not limited to a microprocessor (µP), a microcontroller (µC), a digital signal processor (DSP), or any combination thereof. The processor (710) can include one more levels of caching, such as a level one cache (711) and a level two cache (712), a processor core (713), and registers (714). The processor core (713) can include an arithmetic logic unit (ALU), a floating point unit (FPU), a digital signal processing core (DSP Core), or any combination thereof. A memory controller (715) can also be used with the processor (710), or in some implementations the memory controller (715) can be an internal part of the processor (710).

Depending on the desired configuration, the system memory (720) can be of any type including but not limited to volatile memory (704) (such as RAM), non-volatile memory (703) (such as ROM, flash memory, etc.) or any combination thereof. System memory (720) typically includes an operating system (721), one or more applications (722), and program data (724).

The computing device (700) can have additional features or functionality, and additional interfaces to facilitate communications between the basic configuration (701) and any required devices and interfaces. For example, a bus/interface controller (740) can be used to facilitate communications between the basic configuration (701) and one or more data storage devices (750) via a storage interface bus (741). The data storage devices (750) can be removable storage devices (751), non-removable storage devices (752), or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

Figure 8:
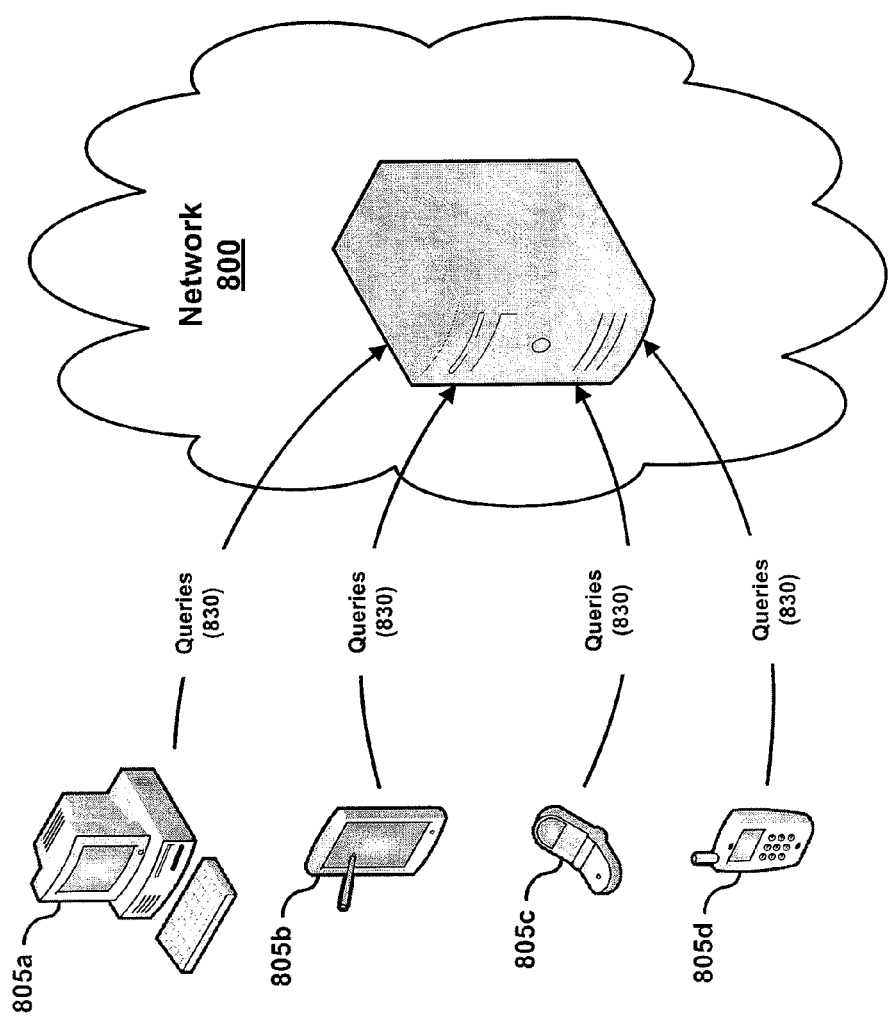
FIG. 8 is a block diagram illustrating an example computing network that may be used to implement various aspects of the invention.

Non-volatile memory (703), removable storage (751), non-removable storage (752), and network storage as depicted in FIG. 8 are all examples of persistent storage for storing the database as described by aspects of the invention. The microprocessor implements the exemplary methods for managing a database. The exemplary process depicted in FIG. 6 runs in volatile memory (704) and pointer blocks, including pointers and their associated summaries are loaded into volatile memory (704) as the process runs. Computer readable medium stores the program that implements the inventive methods.

System memory (720), removable storage (751), and non-removable storage (752) are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the device (700).

The computing device (700) can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device (700) can also be implemented as a personal computer including both laptop computer and non-laptop computer configurations.

Non-volatile memory (703), removable storage (751), and non-removable storage (752) are all examples of persistent storage for storing the database as described by aspects of the invention. A processor (710) may be used to implement the exemplary methods for managing a database. The exemplary process depicted in FIG. 6 runs in volatile memory (704) and pointer blocks, including pointers and their associated summaries are loaded into volatile memory (704) as the process runs. Data blocks are loaded into volatile memory as necessary depending on the results of the comparison between query criteria and a data block's summary (or summaries). Computer readable medium stores the program that contains the inventive methods.

FIG. 8 shows various computing devices each of which may be constructed in a manner similar to the computing device (700) depicted in FIG. 7. Each of these devices is connected to a network. Managing a database in a networked environment is very similar the above description for managing the database in a single computing device. However, in a network, persistent storage can be network storage as depicted in FIG. 8.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for managing a database comprising:
    receiving a data set to be stored in a database;
    organizing and storing the data set into data blocks within a data structure;
    obtaining a pointer to each data block;
    for at least one data block, obtaining a set of values that summarizes a property of the data values stored in the data block;
    associating the set of values with the data block's pointer; and
    storing the set of values in a pointer block with the data block's pointer in the same pointer block as the set of values.

2. The method of claim 1, wherein obtaining the set of values that summarizes the property of the data values, comprises:
    predicting based on historical query data the property that defines the set of values and
    summarizing the range of data values in the data block corresponding to the predicted property.

3. The method of claim 1, wherein multiple sets of values, each representing a property of the data values stored in the data block, are associated with a data block.

4. The method of claim 1, wherein the data structure is a B-tree.

5. The method of claim 1, wherein the data structure is an stable.

6. The method of claim 1, wherein the set of values is in a Bloom Filter.

7. The method of claim 1, wherein the set of values is in a bit-vector.

8. The method of claim 1, wherein the set of values includes range information.

9. The method of claim 1, wherein the property is selected based on an application which is predicted to query the database.

10. A computer-implemented method for managing a database comprising:
    receiving a data structure query;
    loading a pointer block, which includes a data block pointer and an associated set of values, which summarizes a property of the data values stored in the data block, into memory;
    comparing a criteria of the received query to information from the loaded set of values;
    responsive to a match between the query criteria and information from the set of values, dereferencing the data block pointer to find the referenced data block, retrieving the referenced data block from persistent storage, and parsing the retrieved data block to obtain values that are responsive to the query criteria before returning the query results; and
    responsive to no match between the query criteria and the information from the set of values, skipping the data block pointer traversal, the retrieval of the referenced data block from persistent storage, and the parsing of the retrieved data block; and returning the query results.

11. The method of claim 10, wherein the data structure is a B-tree or an stable.

12. The method of claim 10, wherein the set of values is in a Bloom Filter or a bit-vector.

13. The method of claim 10, wherein the set of values includes range information.

14. The method of claim 10, wherein multiple sets of values, each representing a property of the data values stored in the data block, are associated with a data block.

15. A non-transitory computer-readable medium having stored therein computer executable code that causes one or more processors to execute the steps of:
    receiving a data set to be stored in a database;
    organizing and storing the data set into data blocks within a data structure;
    obtaining a pointer to each data block;
    for at least one data block, obtaining a set of values that summarizes a property of the data values stored in the data block;
    associating the set of values with the data block's pointer; and
    storing the set of values in a pointer block with the data block's pointer in the same pointer block as the set of values.

16. The non-transitory computer-readable medium of claim 15, wherein obtaining the set of values that summarizes the property of the data values, comprises:
    predicting based on historical query data the property that defines the set of values and
    summarizing the range of data values in the data block corresponding to the predicted property.

17. The non-transitory computer-readable medium of claim 15, wherein the data structure is a B-tree or an stable.

18. The non-transitory computer-readable medium of claim 15, wherein the set of values is a in Bloom Filter or a bit-vector.

19. The non-transitory computer-readable medium of claim 15, wherein the set of values includes range information.

* * * * *